United States Patent [19]
Dieterich

[11] 3,803,921
[45]*Apr. 16, 1974

[54] SAMPLING AND FLOW MEASURING DEVICE

[76] Inventor: Peter D. Dieterich, 2927 Summit Dr., Michigan City, Ind. 46360

[ * ] Notice: The portion of the term of this patent subsequent to June 1, 1988, has been disclaimed.

[22] Filed: Mar. 5, 1971

[21] Appl. No.: 121,288

Related U.S. Application Data

[63] Continuation-in-part of Ser. No. 744,800, July 15, 1968, Pat. No. 3,581,565.

[52] U.S. Cl. .................................. 73/422 R, 73/212
[51] Int. Cl. ............................................. G01n 1/20
[58] Field of Search........... 73/422 R, 202, 203, 212

[56] References Cited
UNITED STATES PATENTS

| | | | |
|---|---|---|---|
| 3,581,565 | 6/1971 | Dietrich | 73/212 |
| R21,217 | 6/1939 | Boyle | 73/202 |
| 2,091,613 | 8/1937 | Polston | 73/422 R |

*Primary Examiner*—S. Clement Swisher
*Attorney, Agent, or Firm*—Silverman & Cass

[57] ABSTRACT

A device for sampling the fluid flow in a pipe and comprising a probe extending into the flow stream of said pipe. The probe comprises an outer conduit having blind inner and outer ends extending diametrically across the pipe and having a plurality of laterally spaced openings facing the flow and an inner conduit extending from exterior of the pipe to the axial center of the outer conduit from one end thereof and providing the sole communication from the interior of the outer conduit to sample gathering means external of the pipe. The lateral openings sample the stream of fluid at a plurality of areas across the diameter of the pipe, carrying the respective samples into the interior of the outer conduit which constitutes a mixing plenum so that a representative sample is drawn off from the inner conduit.

Instead of drawing the sample off, in the case of gases where the pipe for example constitutes a stack, the sample is passed through a flow sensor and thence returned to the pipe to measure the rate of flow of the fluid.

6 Claims, 4 Drawing Figures

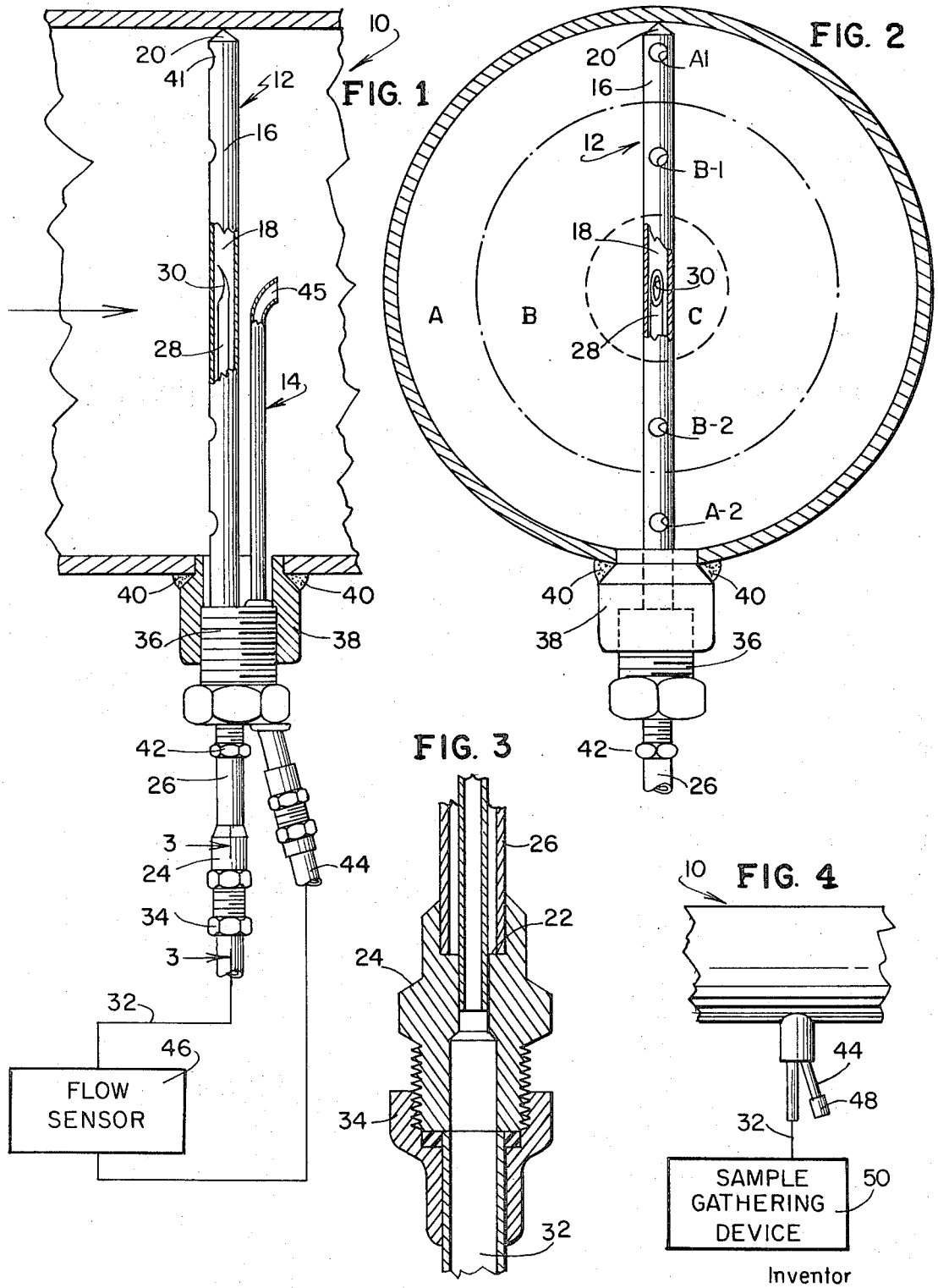

SAMPLING AND FLOW MEASURING DEVICE

CROSS-REFERENCE TO RELATED APPLICATION

This application is a continuation-in-part of a copending application entitled "FLOW MEASURING DEVICE," Ser. No. 744,800, filed July 15, 1968 in the name of the applicant therein, now Pat. No. 3,581,565.

BACKGROUND OF THE INVENTION

This invention relates generally to means for sampling the fluid flowing in a pipe.

The copending application taught the use of probes in a pipe to obtain a differential pressure in a device external of the pipe for measuring flow of the fluid. Where very low velocities are encountered, differential pressure measuring means normally cannot be utilized. Thus, in stacks or pipes carrying gases one can obtain the benefits of the invention of the copending application by returning the sample drawn in at the upstream probe and passing it in relation to a transducer of the variety which responds to very low flow rates and thereafter returning the sample to the downstream probe.

The sample is a representative sample on account of the manner in which it is obtained from the upstream probe and hence, in the art of sampling the fluids flowing in a pipe or stack, whether liquid or gas, only the upstream probe need be used. The sample is led to some sample gathering apparatus external of the pipe or stack.

SUMMARY OF THE INVENTION

The invention utilizes the upstream probe of the structure disclosed in the copending application for gathering samples or for low flow measurement. In the case of the sample gathering, the upstream probe is connected to a sample gathering apparatus external of the pipe or stack. In the case of utilization of the apparatus for low flow measurements, the sample is returned to the downstream probe of the copending application by way of a by-pass external of the pipe or stack, there being a flow sensor in said by-pass.

BRIEF DESCRIPTION OF THE DRAWING

FIG. 1 is a fragmentary sectional view of a fluid carrying pipe or stack in which the sampling and flow measuring device of the invention has been installed;

FIG. 2 is a fragmentary sectional view of the pipe or stack of FIG. 1 broadside of the sampling and flow measuring device viewed from the left side of FIG. 1;

FIG. 3 is a sectional view taken generally along the line 3—3 of FIG. 1 and in the direction indicated; and FIG. 4 is a fragmentary diagrammatic view showing the invention used only for sampling.

DESCRIPTION OF THE PREFERRED EMBODIMENT

The reference character 10 designates generally a pipe or stack in which there is a fluid flowing from left to right as indicated by the flow arrow in FIG. 1. The probes of the copending application are installed in the pipe or stack without material change. The upstream probe is designated 12 and the downstream probe is designated 14. The upstream probe comprises an elongate outer conduit 16, the inside of which provides the averaging plenum 18. The end 20 of the conduit 16 is blind and has a conical tip which is pushed into contact with the interior of the pipe 10 to properly position the probe 14. The interior of the pipe is divide into annular areas A and B as shown in FIG. 2 of substantially equal cross-sectional area and the conduit 16 has openings at the approximate centers of these areas to give a good average sample of the fluid flowing in the areas. There are four openings A1, A2, B1, and B2.

The interior of the conduit 16 has a blind end at 20, as stated, and it also has a blind inner end as shown at 22. This is in the fitting 24 but the effect is as though it were at the pipe. The external tube 26 may be considered an extension of the conduit 16. The only outlet for any fluid which enters the plenum 18 is by way of the inner conduit 28 which has a lateral opening 30 at the center of the plenum and hence picks up the average sample and pressure at this point. The inner conduit 28 is coaxial with the outer conduit 16 and passes the blind end 22 in the fitting 24 to connect to a conduit or line 32 by way of the gland 34 that holds the fitting 24 and connected conduits in assembly.

The inner and outer conduits are soldered together and mounted in a plug 36 that screws into the bushing 38, the latter being welded at 40 to a suitable opening formed in the pipe 10. The conduits 16 and 28 can be rotated on their axis to cause the openings A1, A2, B1 and B2 to face downstream when the device is not in use, and likewise the conduits 16 and 28 may be slid axially in the plug 36. Gland 42 tightens the conduits in place. In installing the probe 12, it is slid into the plug 36 and pushed into the pipe until the tip 20 is felt engaging against the inner surface of the pipe opposite the mounting for the probe. At this time, it is known that the probe 12 is properly positioned with the holes A1, A2, B1 and B2 symmetrical with respect to the axis of the pipe 10.

The plug 36 also carries the downstream probe 14 which connects with the external line 44. It has a downstream opening 45 and as will be seen, both probes are easily removed from the pipe by unscrewing the plug 36.

When it is desired to use the device for measuring low flow, the lines 32 and 44 are connected through a flow sensor 46 which measures the fluid which by-passes from the probe 12 through the sensor 46 and back into the pipe or stack at the probe 14. The sensor may be a hot wire anemometer device, a mechanical flow sensing transducer or the like. It is not intended for use with liquids where the flow rate can be measured by a manometer in terms of differential pressure, but is intended primarily for use with gases as in stacks and flues.

When it is desired to use the device for sampling, the line 44 is plugged as shown at 48 and a sample gathering device 50 is connected to the line 32. The samples obtained in this manner are excellent averages because they are not taken at a single point but rather at a plurality of points across the pipe or stack. The use of the device for sampling is not limited to gases but is useful in sampling liquids flowing in pipes as well.

What it is desired to secure by Letters Patent of the United States is:

1. A flow measuring device for use in connection with a pipe carrying a fluid and said device comprising:

i. an upstream probe having a plurality of spaced lateral openings formed along the length thereof and the probe being engaged through the pipe wall diametrically across the interior of the pipe carrying the fluid, said upstream probe having a blind end contacting the wall of the pipe opposite to the side into which the probe is engaged, whereby to center the lateral openings symmetrically of the axis of the pipe,
   ii. a downstream probe engaged within the pipe and having an opening therein suitable for delivering by-passed fluid back into the pipe,
   iii. said probes having a fixed axial spaced alignment one relative to the other and the pipe in installed condition, and said upstream probe being sealingly translatable relative to and independently of the pipe and the downstream probe to enable the engagement of said blind end with said pipe wall,
   iv. conduit means exterior of the pipe leading to the respective probes and providing a by-pass path whereby a sample of fluid from said pipe will enter said upstream probe, pass through said by-pass path and return to said pipe by way of said opening of said downstream probe, and
   v. a flow sensor connected in said by-pass path and responsive to the rate of flow of the sample in said by-pass path.

2. The flow measuring device as claimed in claim 1 in which the upstream probe comprises a first hollow conduit disposed in the pipe diametrically transverse of the normal flow of fluid in the pipe, said first hollow conduit having blind ends, one being said end contacting the inner wall of the pipe, said first hollow conduit having said plurality of spaced lateral openings formed therein along the length thereof in that portion of the conduit within the pipe and facing the flow, and a second hollow conduit having a free end with an opening therein terminating substantially at the center of the pipe but on the interior of the first hollow conduit, said second hollow conduit communicating with said conduit means exterior of the pipe and providing the only communication between the interior of the first hollow conduit and said by-pass path.

3. A sampling device for use in connection with a pipe carrying a fluid and said device comprising:
   i. a probe having a plurality of spaced lateral openings formed along the length thereof and the probe being engaged through one pipe wall diametrically across the interior of the pipe carrying the fluid, said probe having a blind end contacting the wall opposite the side into which it is engaged, whereby to center the lateral openings symmetrically of the axis of the pipe,
   ii. said probe being sealingly translatable relative to and independently of the pipe to enable the contacting of said blind end with said pipe wall,
   iii. the openings facing upstream whereby to receive samples of said fluid into each opening and mix the samples within the interior of the probe,
   iv. conduit means exterior of the pipe connecting with said probe, and
   v. sample gathering means connected with said conduit means to receive the average sample fluid from the interior of said probe.

4. The sampling device as claimed in claim 3 in which the probe comprises a first hollow conduit disposed in said pipe diametrically transverse of the normal flow of fluid in the pipe and having blind ends, one being said end contacting said inner wall of the pipe, said plurality of openings being formed in said first hollow conduit in that portion disposed within the pipe, a second hollow conduit having a free end with an opening therein terminating substantially at the center of the pipe but in the interior of the first hollow conduit, said second hollow conduit communicating with said conduit means and providing the only communication between the interior of said first hollow conduit and said sample gathering means.

5. A flow measuring device for use in connection with a pipe carrying a fluid and said device comprising:

i. a probe having a plurality of spaced lateral upstream impact openings formed along the length thereof and the probe being engaged through the pipe wall diametrically across the interior of the pipe carrying the fluid, said probe including an interior conduit having a blind end contacting the wall of the pipe opposite to the side into which the probe is engaged, whereby to center the lateral opening symmetrically of the axis of the pipe,
   ii. a downstream probe engaged in a conduit in the pipe and including a static opening therein suitable for delivering by-passed fluid back into the pipe,
   iii. said impact and static openings having a fixed axial spaced alignment one relative to the other and the pipe in installed condition, and said upstream probe being sealingly translatable relative to and independently of the pipe to enable the engagement of said blind end with said pipe wall,
   iv. conduit means exterior of the pipe leading to the respective interior and downstream conduits and providing a by-pass path whereby a sample of fluid from said pipe will enter said upstream impact conduit, pass through said by-pass path and return to said pipe by way of said static opening, and
   v. a flow sensor connected in said by-pass path and responsive to the rate of flow of the sample in said by-pass path.

6. A flow measuring device for use in connection with a pipe carrying a fluid and said device comprising:

i. a probe having a plurality of spaced lateral upstream impact openings formed along the length thereof and the probe being engaged through the pipe wall diametrically across the interior of the pipe carrying the fluid, said probe including an interior conduit having a blind end closely adjacent the wall of the pipe opposite to the side into which the probe is engaged, the lateral openings symmetrically centered of the axis of the pipe,
   ii. a downstream probe engaged in a conduit in the pipe and including a static opening therein suitable for delivering fluid and fluid pressure to the pipe,
   iii. said impact and static openings having a fixed axial spaced alignment one relative to the other and the pipe in installed condition, and said upstream probe being sealingly translatable relative to and independently of the pipe,
   iv. conduit means exterior of the pipe leading to the respective interior and downstream conduits and providing a by-pass path whereby a sample of fluid from said pipe will enter said upstream impact conduit, pass through said by-pass path and return to said pipe by way of said static opening, and
   v. a flow sensor connected in said by-pass path and responsive to the rate of flow.

* * * * *